United States Patent
Tominaga

[11] Patent Number: 6,032,614
[45] Date of Patent: Mar. 7, 2000

[54] HOUSING FOR A SMALL ANIMAL

[75] Inventor: Kazutoshi Tominaga, Osaka, Japan

[73] Assignee: Kabushiki Kaisha Tominaga Jyushi Kogyosho, Osaka, Japan

[21] Appl. No.: 09/048,029

[22] Filed: Mar. 26, 1998

[30] Foreign Application Priority Data

Mar. 27, 1997 [JP] Japan ..................................... 9-075611

[51] Int. Cl.[7] .............................. A01K 1/03; A01K 1/035
[52] U.S. Cl. ........................................................... 119/452
[58] Field of Search ................................. 119/28.5, 161, 119/163, 165, 453, 454, 482, 484, 496, 501, 621, 706, 472

[56] References Cited

U.S. PATENT DOCUMENTS

| | | | |
|---|---|---|---|
| 3,958,534 | 5/1976 | Perkins et al. | 119/15 |
| 5,320,065 | 6/1994 | Leopold | 119/19 |
| 5,456,208 | 10/1995 | Choenchom | 119/17 |
| 5,678,509 | 10/1997 | Dillon | 119/496 |
| 5,862,778 | 1/1999 | Matsumoto | 119/472 |

*Primary Examiner*—Thomas Price
*Attorney, Agent, or Firm*—Armstrong, Westerman Hattori, McLeland & Naughton

[57] ABSTRACT

A housing for a small pet animal has a housing body, a plurality of unit plates and attaching mechanism for the unit plates. The unit plates form a shape which fits in the housing body in a horizontal state when combined with each other on an plane. The attaching mechanism is formed on at least one of the unit plates and the housing body to detachably attach the unit plates to the housing body. The unit plates form a partitioning plate for dividing an inner space of the housing body into an upper space and a lower space when the unit plates are combined on a plane in the housing body and are attached to the housing body by the attaching mechanism. The unit plates form stages when at least one of the unit plates are attached to the housing body at a level different from the other unit plates.

4 Claims, 5 Drawing Sheets

HOUSING FOR A SMALL ANIMAL

BACKGROUND OF THE INVENTION

1. Field of the Invention

The present invention relates to a housing for a small pet animal used for observing and/or breeding a small pet animal such as a hamster or the like.

2. Description of the Related Art

Recently, hamsters have become popular small pet animals especially for city dwellers since hamsters have a nice appearance and a good behavior and are easy to keep even in a relatively small house such as an apartment house, a town house, and the like.

However, hamsters have a habit wherein the parent hamsters bite their own babies to death if hamsters other than the parent hamsters interfere with the babies soon after birth. Therefore, it is necessary to separate or isolate the baby hamsters together with their parent hamsters from other hamsters for a while after the birth.

A conventional easy way to separate the baby hamsters together with their parent hamsters from other hamsters is to move the babies and their parent hamsters to another housing. However, this requires two housings, thereby causing an economic disadvantage. A larger space for disposing two housings is also required.

Another method of separation is to divide an inner space of the housing by a partitioning wall into two spaces. However, in this method, the partitioning wall will become useless later on. In other words, the partitioning wall cannot be utilized for another purpose other than for dividing the housing. Thus, the partitioning wall cannot be utilized effectively.

In addition, a conventional housing provides hamsters with a flat activity environment, which lacks in variety and which fails to provide a stimulating and comfortable activity environment for the hamsters. Accordingly, a conventional housing cannot fully satisfy either the hamsters or the user.

SUMMARY OF THE INVENTION

The object of the present invention is to provide a housing for a small pet animal which enables its components to be effectively utilized, and also enables some animals, such as baby animals just after their birth together with their parents, to be separated from other animals so as to safely breed them without requiring an additional housing.

Another object of the present invention is to provide a housing for a small pet animal that can provide a three-dimensional activity space and a comfortable breeding environment with low costs.

In order to achieve the above-mentioned objects, according to the present invention, a housing for a small pet animal includes a housing body and a plurality of unit plates. The plurality of unit plates can be combined on a plane to form a shape which fits in the housing body in a horizontal state. The housing further includes an attaching means formed on at least one of the unit plates and the housing body to detachably attach the unit plates to the housing body. The unit plates form a partitioning plate for dividing an inner space of the housing body into an upper space and a lower space when the unit plates are combined with each other on a plane in the housing body and are attached to the housing body by the attaching means. The unit plates form stages when at least one of the unit plates is attached to the housing body at a level different from the other unit plates.

According to the housing, since a partitioning plate is formed by the unit plates and can divide an inner space of the housing body into an upper space and a lower space, for example, parent hamsters and their babies can be separated from other hamsters to safely breed them for a while just after their birth.

Since an inside of the housing can be divided into two spaces, it is not necessary to prepare an additional housing for separating some of the small pet animals from the others, thereby an additional space for disposing such an additional housing is not required, which also results in lower costs.

Since a plurality of unit plates can be attached in an inner space of the housing at different levels to form stages on which the small pet animals can freely go up and down, the activity space for the small pet animals becomes three-dimensional.

Since the unit plates are used as a partitioning wall and stages, the unit plates can be effectively utilized.

It is preferable that the unit plates include an opening which allows a small pet animal to pass through and a cap detachably fitted in the opening. In this case, if the unit plates form stages and the cap is detached from the opening so that the small pet animals can pass through the opening, the number of passages for the small pet animal increases, thereby resulting in a breeding environment that is complicated and full of variety. When the unit plates form a partitioning wall, it is possible to surely separate an inner space of the housing by closing the opening with the cap.

It is preferable that the housing body is formed by a plurality of wires extending horizontally and spaced at predetermined distances, and that the attaching means includes a hook portion detachably engageable with the wire and formed on an edge portion of the unit plate, thereby the unit plates are detachably attached to the housing body with the hook portion engaged with the wire. When such a structure is employed, it is possible to surely attach the unit plate at a desired position.

It is preferable to provide an upwardly protruded edge portion formed along an outer edge portion of the unit plate. When such a structure is employed, it is possible to prevent excrement of the small animals from scattering around the housing by the edge portion.

The present invention will be more fully described and better understood from the following description of one detailed example, taken with the appended drawings.

Other objects and features will be apparent from the following detailed description of the invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings.

Figure 1:
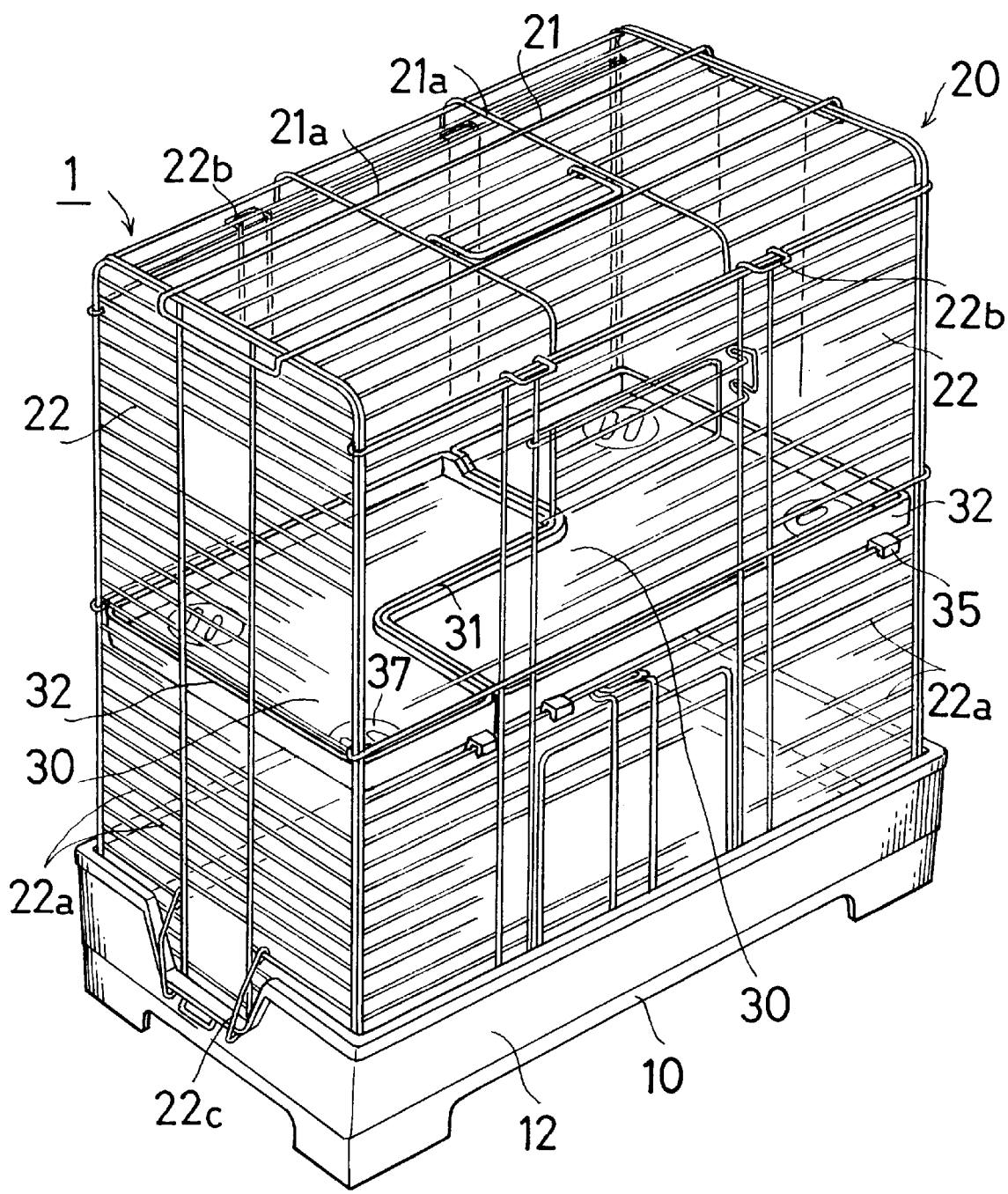
FIG. 1 is a perspective view showing one example of the housing for hamsters according to the present invention.
Figure 2:
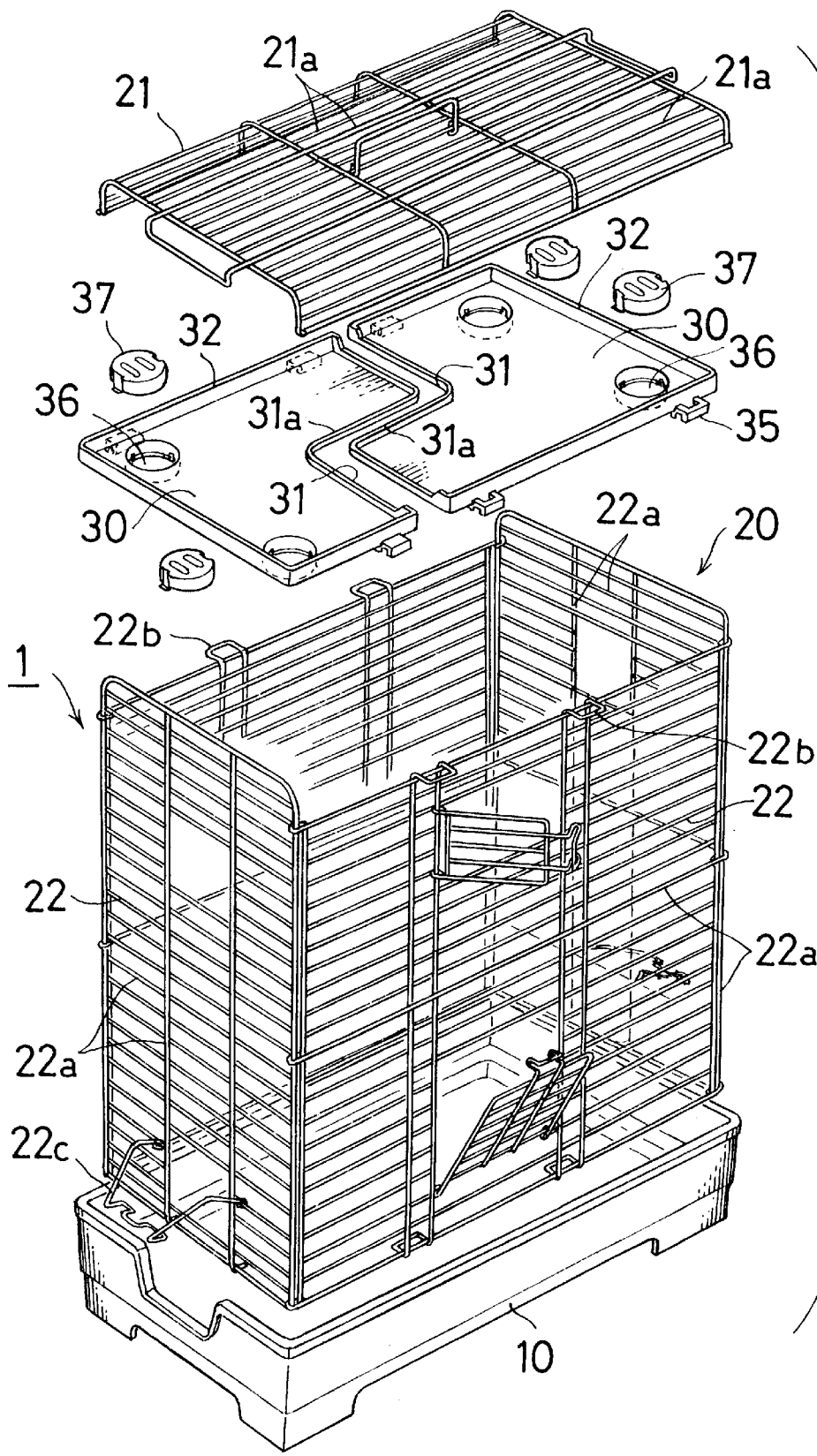
FIG. 2 is a perspective view of the housing in a disassembled state.
Figure 3:
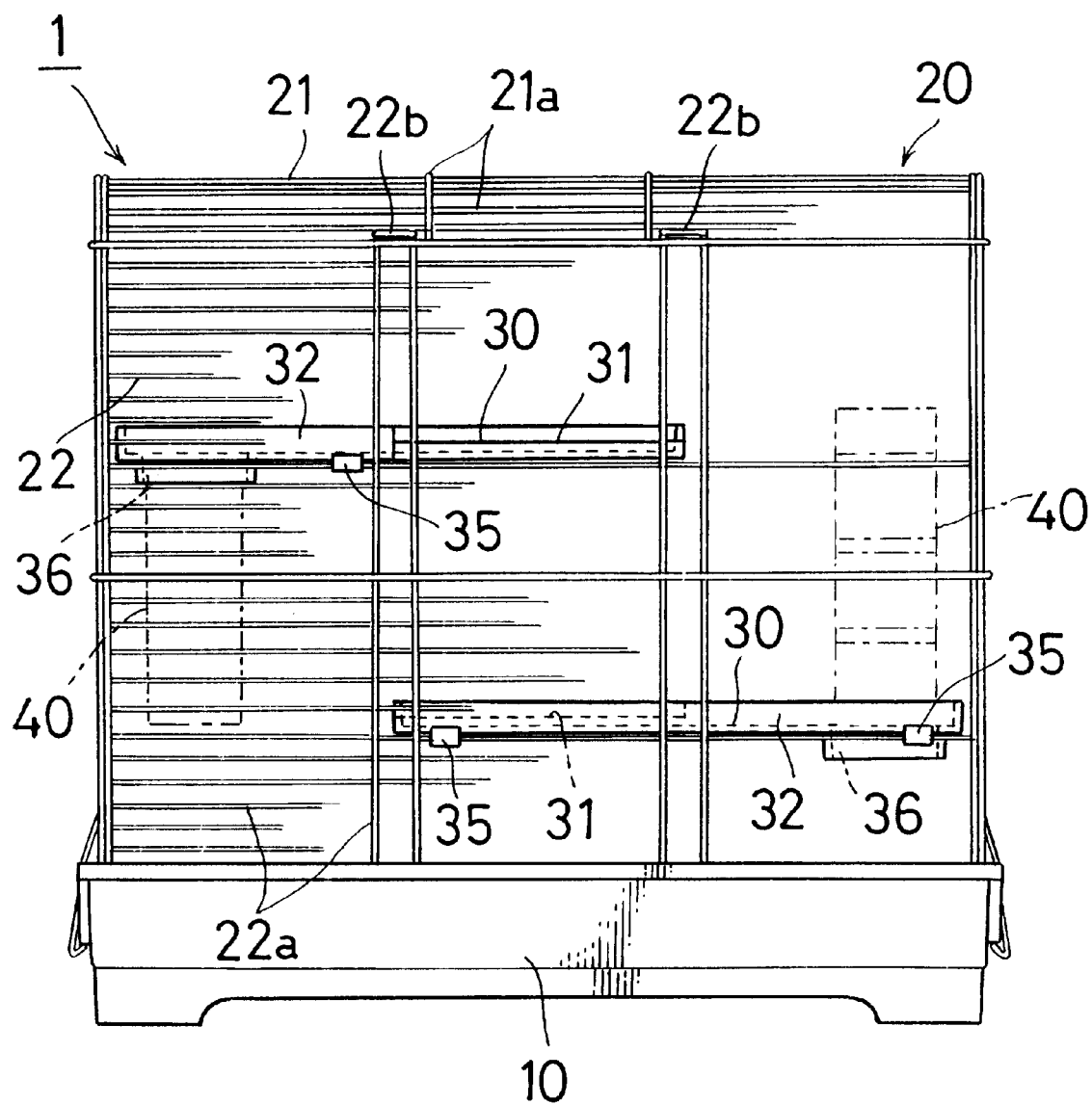
FIG. 3 is a side view showing the housing in which stages are formed.

FIGS. 1 to 3 show an embodiment of a housing for hamsters according to the present invention.

As shown in these figures, the housing includes a housing body 1 for hamsters and two unit plates 30, 30 disposed in an inner space of the housing body 1. The housing body 1 includes a base tray 10 made of synthetic resin and a cage-type upper cover 20. The upper cover 20 includes a top wall 21 and four side walls 22. Each wall is made of a plurality of wires 21a, 22a crossed with each other transversely and longitudinally. For example, the side wall 22 includes a plurality of horizontal wires 22a spaced apart a predetermined distance in a vertical direction.

The four side walls 22 are connected with each other such that some of the horizontal wires 22a at both side ends of a side wall 22 are extend outward and around the side vertical wires 22a of the adjacent side walls 22 to provide a pivotable connection between the adjacent side walls. Among the four side walls 22, the front and rear side walls 22 have, at their upper ends, a pair of outwardly protruded hooks 22b. Each hook 22b is detachably engaged with a corresponding wire 21a disposed at a front or rear edge of the top wall 21. Thus, the top wall 21 is detachably attached to the four side walls 22 so as to close an upper opening of the four side walls 22.

At lower outer portions of the right and left side walls 22, hooks 22c for fixing the upper cover 20 to the base tray 10 are provided. Each hook 22c is detachably engaged with an edge of a cut-out portion of the base tray 10 in such a state that a lower portion of the side walls 22 are fitted in side walls 12 of the base tray 10. Thus, the upper cover 20 is detachably attached to the base tray 10.

On the other hand, as best shown in FIG. 2, each unit plate 30 is a semitransparent hard plastic molded article having a generally L-shape plan view. The unit plates 30, 30 form a rectangular shape conforming to a horizontal cross-sectional shape of the upper cover 20 when they are combined with each other on a plane, i.e., when they are disposed against each other by abutting the corresponding adjoining edge portions 31, 31 on a plane.

Figure 4A:
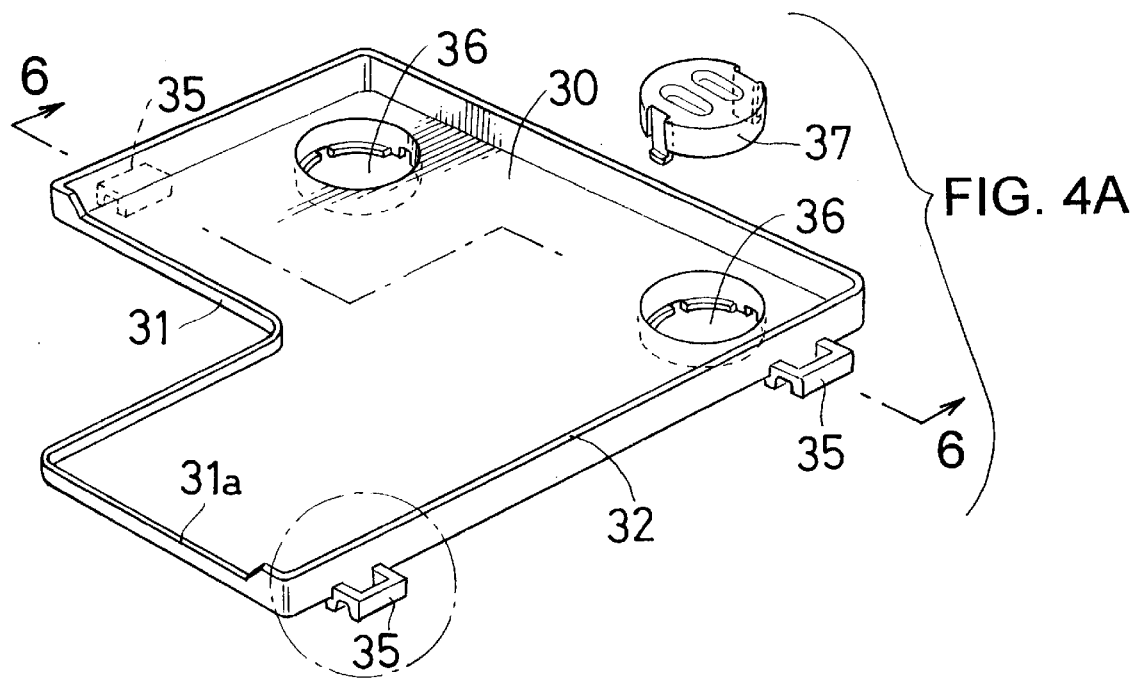
FIG. 4A is a perspective view of the unit plate employed in the housing.

As shown in FIG. 4A, each unit plate 30 is provided with an integrally formed upwardly protruded edge plate 32 extending along an outer peripheral portion of the unit plate 30 except at the adjoining edge portion 31. Along the adjoining edge portion 31, an upwardly protruded rib 31a is provided that is lower than the edge plate 32.

Figure 4B:
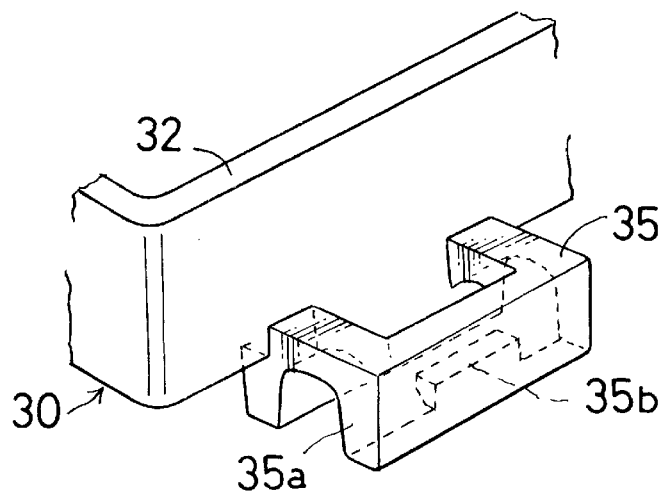
FIG. 4B is an enlarged perspective view showing the portion encircled with a broken dotted line in FIG. 4A.
Figure 5:
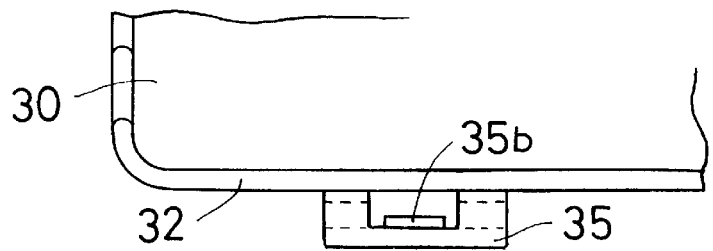
FIG. 5 is an enlarged partial plan view showing the hooking arm of the unit plate and surrounding portions.

Further, each unit plate 30 is, at front and rear sides thereof, integrally provided with hooking arms 35 that protrude sideways for attaching the unit plate 30 to the upper cover 20. Each hooking arm 35 is formed to have a reversed U-shape. As shown in FIGS. 4B and 5, one of the hooking arms 35 of each unit plate 30 has an engaging protrusion 35b integrally formed on an inner surface of an outer hook portion 35a.

As shown in FIG. 4A, circular openings 36, which allow a hamster to pass there-through, are formed in a flat portion of the unit plate 30. A cap 37 having a circular shape can be fitted in the opening 36. The cap 37 can be locked when the cap is fitted in the opening 36. Thus, fitting and locking the cap 37 in the opening 36 prevents hamsters from passing through the opening 36. On the other hand, unlocking and removing the cap 37 from the opening 36 allows hamsters to pass through the opening 36.

The above-mentioned housing for hamsters can present two modifications as the occasion demands. One modification is that the housing body 1 can be divided into two spaces, and the other modification is that stages can be formed at predetermined heights in the container 1 so that hamsters can freely go up and down.

Figure 6:
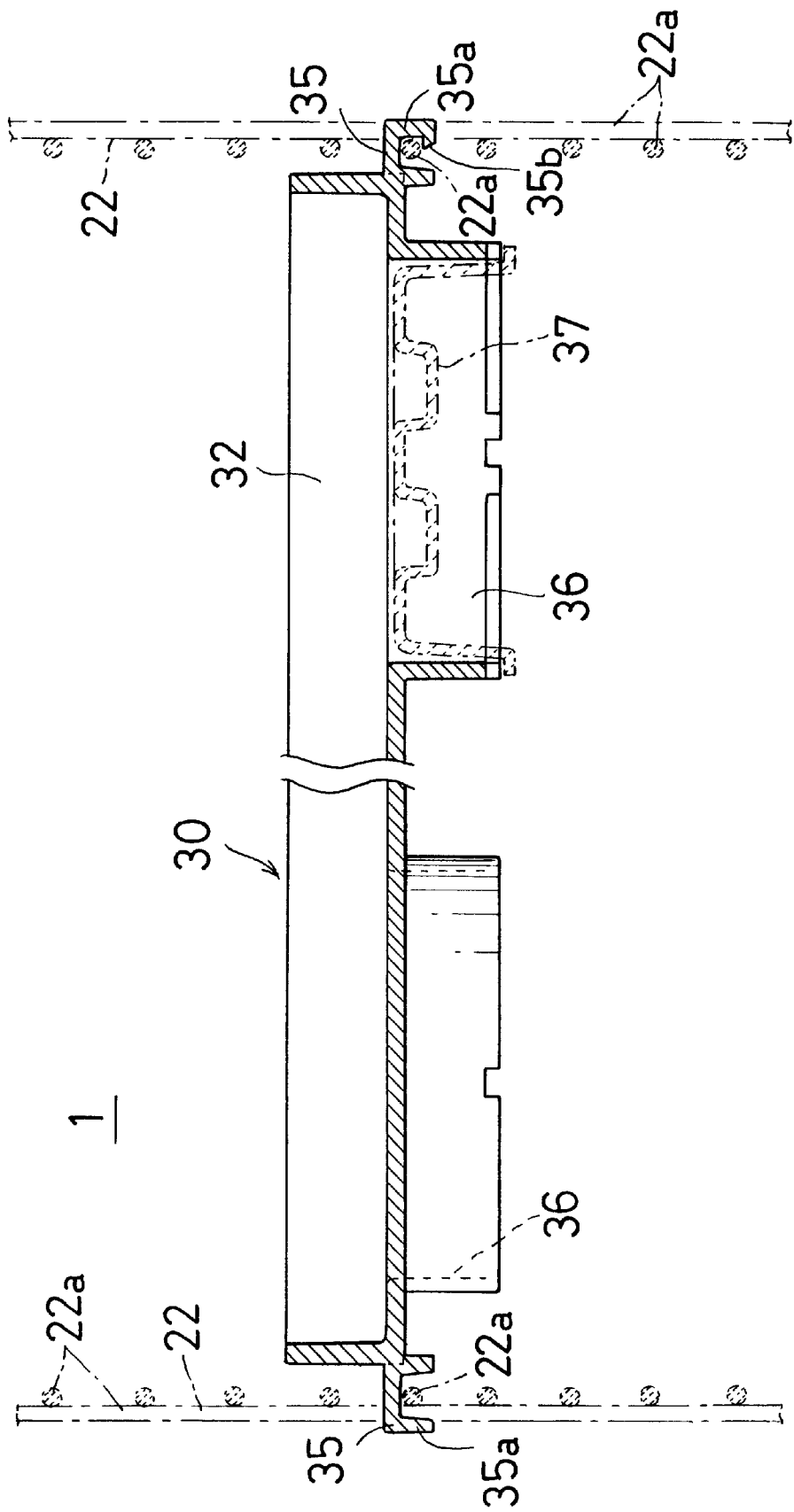
FIG. 6 is a cross-sectional view taken along the line 6—6 of FIG. 4A.

If it is required to divide an inner space of the housing body 1 into two spaces so as to separate baby hamsters together with their parent hamsters from other hamsters, for example, the following procedures can be taken. First, all of the openings 36 of each unit plate 30 are closed by the caps 37 to prevent hamsters from passing through the openings 36. Then, one of the unit plates 30 is disposed horizontally at a predetermined height in the housing body 1 and the hooking arms 35 are engaged with a horizontal wire 22a of a side wall 22 at a desired height. At this time, as shown in FIG. 6, the hooking arm 35 having the protrusion 35b is pushed down until the protrusion 35b is disposed under the wire 22a. Thus, the hooking arm 35 having the protrusion 35b is prevented from unintentionally detaching from the wire 22a so as to surely fix the unit plate 30 to the side wall 22. In this embodiment, when the hooking arm 35 having the protrusion 35b is forcibly pulled up against the wire 22a, the hooking arm 35 is released, thereby enabling the unit plate 30 to be taken off of the side wall 22.

Then, the other unit plate 30 is disposed at the same level of the above-mentioned unit plate 30 in the housing body 1 and the hooking arms 35 of the other unit plate 30 are engaged with corresponding horizontal wire 22a in the same manner as described above so that the adjoining edge portions 31, 31 of both of the unit plates 30, 30 abut with each other without forming a gap therebetween, as shown in FIG. 1. Thus, both the unit plates 30, 30 form a dividing wall that divides an inner space of the housing body 1 into an upper space and a lower space. Therefore, for example, baby hamsters and their parent hamsters may be kept in a lower space formed below the dividing wall and the other hamsters may be kept in an upper space formed above the dividing walls so as to surely isolate the babies and their parent hamsters from the other hamsters to breed the babies without any trouble.

On the other hand, when it is no longer necessary to divide the housing body 1 into two spaces, the unit plates 30 can be disposed at different levels as shown in FIG. 3. In detail, one of the unit plates 30 can be horizontally disposed at an appropriate level in the same manner as described above and the other unit plate 30 can be horizontally disposed at a different level. In this way, stages 30, 30 can be formed by horizontally attaching two unit plates 30, 30 at different levels in the housing body 1.

In this state, since hamsters can freely go up on each stage 30, 30 and go down therefrom, a three-dimensional activity space for hamsters becomes available, which results in a comfortable and appropriately stimulating breeding environment. Thus, both the hamsters and their breeders can be fully satisfied.

When the stages are formed by the unit plates 30, it is possible to obtain a breeding environment that is full of variety by removing the caps 37 from the openings 36 to allow the hamsters to pass through the openings 36, which increases the number of passageways for the hamsters. Further, a passage tube 40 that the hamsters can pass through may be fitted into the opening 36 of the unit plate 30 as shown by the phantom lines in FIG. 3, which makes a breeding environment that is full of variety since the hamsters can go up and down through the tube(s) 40.

According to above-mentioned housing, since an inner space of the housing body 1 can be divided into two spaces by horizontally attaching the unit plates 30, 30 at the same level in the housing body 1, it is possible to isolate, for example, baby hamsters and their parent hamsters from other hamsters for safe breeding.

Since two stages that hamsters can freely go up and down can be formed in the inner space of the housing body 1 by attaching the unit plates 30 at different levels in the housing body 1, a three-dimensional activity space for the hamsters can be obtained, which makes the breeding environment comfortable and appropriately stimulating.

According to the housing of the present embodiment, the inner space of the housing body 1 can be divided into two isolated spaces. Therefore, an additional space for disposing an additional housing can be omitted and the housing can be produced less expensively, as compared to cases wherein an additional container is required.

In addition, since the unit plates 30 can be used not only as a partitioning wall but also as stages, the components can be effectively utilized.

According to the present embodiment, the hooking arm 35 of the unit plate 30 can be engaged with any one of a plurality of wires 22a forming the side wall 22 of the housing body 1 to fix the unit plate 30 to the housing body 1. Therefore, it is possible to freely adjust the levels at which the unit plates 30, 30 are attached and thus the partitioning wall and stages can be formed at any desired position.

According to the present embodiment, the edge plate 32 is provided at the outer edge portion of the unit plate 30. Therefore, excrement of the hamsters on the unit plate 30 can be prevented form being scattered off of the unit plate 30, i.e., out of the housing body 1. Thus, it is possible to prevent the space around the housing from being soiled.

In addition, since the edge plate 32 and the rib 31b are formed integrally with the outer edge portion of the unit plate 30, it is possible to improve the rigidity of the unit plate 30, resulting in a sufficient durability.

In the above described embodiment, the housing includes two unit plates 30. However, the present invention is not limited thereto. The housing may include three or more unit plates 30. Further, the shape of the unit plate is not limited to the shape as described above. Additionally, the present invention is not limited to the housing body of cage-type as described above. For example, the housing body may be a molded plastic article including an upper cover made of hard synthetic resin.

Though preferred embodiments according to the present invention have been described, it should be recognized that many modifications are possible which fall within the scope of the present invention. This application claims priority to Japanese Patent Application No. Hei 9(1997)-75611, the disclosure of which is incorporated by reference in its entity.

The terms and expressions which have been employed herein are used as terms of description and not of limitation, and there is no intent, in the use of such terms and expressions, of excluding any of the equivalents of the features shown and described or portions thereof, but it is recognized that various modifications are possible which fall within the scope of the invention claimed.

What is claimed is:

1. A housing for a small pet animal, the housing comprising:

a housing body;

a plate-shaped member composed of a plurality of unit plates having complemental fitting edges, said plurality of unit plates forming a shape which generally coincides with a horizontal cross-section of said housing body when combined with each other on a plane so as to fit said corresponding complemental fitting edges; and an attaching means formed on at least one of said unit plates and said housing body to detachably attach said unit plates to said housing body, wherein said plate-shaped member forms a single partitioning plate for dividing an inner space of said housing body into an upper space and a lower space when said unit plates are combined with each other on a plane in said housing body so as to fit said corresponding complemental fitting edges and are attached to said housing body by said attaching means, and wherein said plate-shaped member forms a plurality of stage plates when said plate-shaped member is in a disassembled state and at least one of said unit plates is attached to said housing body at a level different from the other unit plates.

2. The housing apparatus as recited in claim 1, wherein one of said unit plates includes an opening which allows the small pet animal to pass through and a cap detachably fitted in said opening.

3. The housing apparatus as recited in claim 1, wherein said housing body includes a plurality of wires extending horizontally and spaced at predetermined distances, wherein said attaching means includes a hook portion detachably engaged with one of said wires and provided on an edge portion of said unit plate, whereby said unit plates are detachably attached to said housing body with said hook portion engaged with said at least one wire.

4. The housing apparatus as recited in claim 1, wherein said unit plates are provided with an upwardly protruded edge portion formed along an outer edge portion of said unit plates.

* * * * *